United States Patent [19]
Hogenboom et al.

[11] Patent Number: 5,766,725
[45] Date of Patent: Jun. 16, 1998

[54] COMPOSITE WEB OF MUTUALLY PARALLEL FIBRES IN A MATRIX

[75] Inventors: Eric H. M. Hogenboom, Maastricht; Engelbertus H. M. Van Gorp, Beek; Martinus C. A. Van Den Aker, Tilburg, all of Netherlands

[73] Assignee: DSM N.V., Heerlen, Netherlands

[21] Appl. No.: 583,061

[22] PCT Filed: May 31, 1994

[86] PCT No.: PCT/NL94/00123

§ 371 Date: Apr. 3, 1996

§ 102(e) Date: Apr. 3, 1996

[87] PCT Pub. No.: WO95/00318

PCT Pub. Date: Jan. 5, 1995

[30] Foreign Application Priority Data

Jun. 23, 1993 [BE] Belgium ............... 09300643

[51] Int. Cl.$^6$ .................. B32B 5/12; B29C 70/50
[52] U.S. Cl. .................. 428/113; 428/105; 428/109; 428/111; 428/114; 428/902; 428/911; 442/236; 442/394; 264/510; 264/DIG. 47; 264/297.1; 264/241
[58] Field of Search .................. 428/113, 105, 428/109, 111, 114, 902, 911; 442/236, 394; 264/510, DIG. 47, 297.1, 241

[56] References Cited

FOREIGN PATENT DOCUMENTS

| 2 330 530 | 6/1977 | France . |
| 2042414 | 9/1980 | United Kingdom . |
| 2051667 | 1/1981 | United Kingdom . |
| 89/01127 | 2/1989 | WIPO . |
| 91/12136 | 8/1991 | WIPO . |

*Primary Examiner*—Richard Weisberger
*Attorney, Agent, or Firm*—Cushman Darby & Cushman Intellectual Property Group Of Pillsbury Madison & Sutro LLP

[57] ABSTRACT

The invention relates to a composite web comprising one elongated flat composite layer of mutually parallel fibers in a matrix, in which the fibers run at an angle $\alpha$ (differing from 0°) relative to the lengthwise direction of the web, and which in the lengthwise direction is made up of joined-up and connected web parts. This composite web can be used for continuously producing multi-layer composites. The composite layer of the composite web has no areas with overlap or gaps when placed in a multi-layer composite. The invention also relates to a method for the production of this composite web and of multi-layer composites.

20 Claims, 5 Drawing Sheets

COMPOSITE WEB OF MUTUALLY PARALLEL FIBRES IN A MATRIX

The invention relates to a composite web. In the context of this invention a composite web is understood to mean an elongated, flat object of indeterminate length which comprises one elongated composite layer of mutually parallel fibres in a matrix.

WO-A-91/12136 discloses an elongated two-layer composite structure, in which the first layer consists of fibres in a matrix which run in the lengthwise direction of the structure, and the second layer consists of fibres in a matrix which run at right angles to said lengthwise direction. Such a two-layer structure, in which the fibres in the various layers run in different directions, from here onwards is called a cross-layered web. A composite web in which the fibres run parallel to the lengthwise direction of the web from here onwards is described as a parallel web. In WO-A-91/12136 the second layer is produced by cutting rectangular pieces off a parallel web, the length of which pieces is essentially the same as the width of the parallel web, and laying said pieces one after the other on another parallel web, with the fibres running at right angles to the lengthwise direction of said web. After this, the composite layers are firmly connected to each other under the influence of pressure and heat.

It is technically very difficult to lay the abovementioned cut-off pieces in a continuous process accurately joined up at the desired angle without the successive pieces overlapping, with the result that thickened parts are produced, or without spaces (gaps) remaining between the successive pieces. Moreover, loose pieces of composite layer with parallel fibres are difficult to handle, because they tear easily in the direction of the fibre. This is particularly the case if the composite layer is very thin and has a high fibre content such as is desirable for use, for example, in anti-ballistic composites.

There is therefore a need for a composite web, in addition to the already existing parallel web, in which the fibres in the composite layer run at an angle differing from 0° relative to the lengthwise direction of the web, which composite web has fewer or none of the abovementioned disadvantages and drawbacks in the production of multi-layer composite structures, such as, for example, a cross-layered web.

This need is met according to the invention by a composite web (3) which in the lengthwise direction is made up of joined-up and connected web parts (7), which web parts contain a separating layer (8) and thereon a composite layer (4) of mutually parallel fibres (5) in a matrix (6), the composite layer of each web part being bounded by two transverse sides (1) and (2) lying opposite each other and running parallel to the fibres, which web parts are joined up, with transverse side (1) of the composite layer of each web part facing and parallel to transverse side (2) of the composite layer of the joined-up web part, and with the fibres in the web parts at an angle α (differing from 0°) to the lengthwise direction of the composite web, and in which the separating layers (8) of the joined-up web parts are connected to each other.

The composite web according to the invention, which is called a transverse web below, can be used for the continuous production of multi-layer composites by simple techniques.

A further advantage of the transverse web is that through the presence of the separating layer as a support, the composite layer is easy to handle, without the risk of the composite layer tearing. This means that the composite layer can be very thin, and a smaller quantity of matrix material is sufficient to bind the fibres in the composite layer, with the result that the composite layer can have a higher fibre content. This is an advantage in particular for achieving a high protection level in multi-layer anti-ballistic composites. Here and below, "the separating layer of the transverse web" is meant to convey the total interconnected separating layers of the web parts of the transverse web.

Another important feature of the transverse web is that after removal of the separating layer of the transverse web, the composite layers of the connected web parts have no overlap, and thus no local thickened parts at the position where the web parts are connected. An advantage of this is that fewer problems occur in the production of multi-layer composites. A further advantage of this in the case of use in multi-layer anti-ballistic composites is that the protection level does not vary so greatly over the surface of the multi-layer composite, with the result that said multi-layer composites have a higher ratio between the lowest protection level on the surface and the weight per unit surface.

The invention will be explained with reference to a number of examples of embodiments shown in the drawings.

FIGS. 3a, 3b, 3c and 3d show a number of suitable embodiments of the joining up and connecting of the web parts.

The web parts 7 contain a separating layer 8 and thereon a composite layer 4 of mutually parallel fibres 5 in a matrix 6, the composite layer of each web part being bounded by two transverse sides 1 and 2 which lie opposite to each other and run parallel to the fibres (see FIGS. 1a to 1d).

The fibres in the composite layer run parallel to each other in such a way that the composite layer can be torn off parallel to the direction of the fibres without a great amount of fibres being pulled out of the composite layer. The fibres preferably run essentially straight.

Figure 1A:
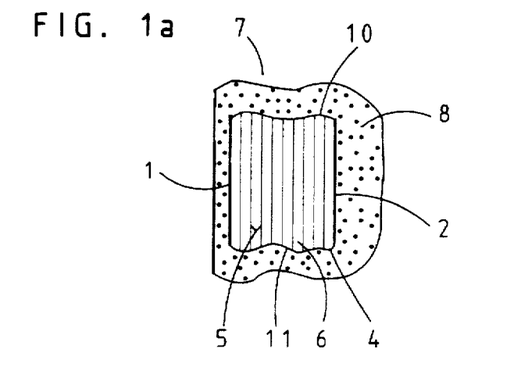
FIG. 1a shows an embodiment of a web part in which the separating layer projects beyond all sides of the composite layer, and in which the edge of the separating layer at one transverse side runs parallel to said transverse side.

The sides 10 and 11 of the composite layer, called longitudinal sides below, can run arbitrarily (FIG. 1a). In practice, it is preferable for these longitudinal sides to run straight and mutually parallel. The composite layer of each web part is thus preferably parallelogram-shaped with a minimum angle $\alpha$ between the transverse sides and the longitudinal sides (FIG. 1b: $\alpha=90°$; and FIG. 1c: $\alpha=45°$). The advantage of this is that the edges 12 and 13 of the transverse web formed by the longitudinal sides 10 and 11 of the web parts run straight and parallel even if the angle $\alpha$ differs from 90° (FIG. 2b).

The separating layer 8 serves to support the composite layer and to give sufficient tensile strength to the transverse web. The separating layer must just adhere sufficiently to the composite layer to hold it during treatment of the transverse web, but it must adhere so little that it is easy to remove from said composite layer after a second layer which connects the web parts has been applied to the composite layer of the transverse web. Suitable materials for the separating layer are, for example, plastics such as, for example, nylon, polyester or polyvinyl chloride. Wax paper or kraft paper is preferably used, and the face of the separating layer facing the composite layer is provided with a non-stick layer (for example of silicones).

Figure 1B:
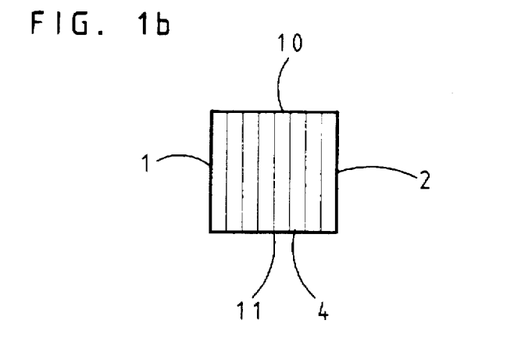
FIG. 1b shows an embodiment of a web part in which the edges of the separating layer coincide with the sides of the composite layer.
Figure 1C:
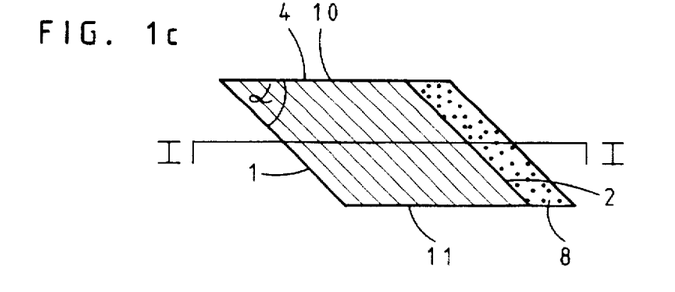
FIG. 1c shows an embodiment of a web part in which the composite layer is parallelogram-shaped with a minimum angle α between the sides of the composite layer, and in which the separating layer projects beyond one transverse side.
Figure 1D:
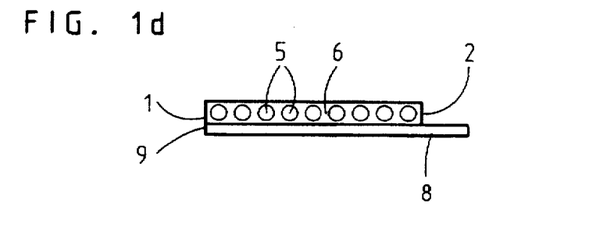
FIG. 1d shows a section along line I—I of the web part from FIG. 1c.

In a web part the separating layer can project beyond all sides of the composite layer. It is, however, preferable for the edge of the separating layer to run parallel to transverse side 1, in order to be able to make the web parts abut well against each other (FIG. 1a). On the longitudinal sides 10 and 11, in practice the edge of the separating layer generally coincides with the edge of the composite layer, because the web parts are preferably cut out of a parallel web 14 (see FIG. 2a). It is most preferable for the edge of the separating layer 9 of each web part to coincide with transverse side 1 of the composite layer, as illustrated in FIGS. 1b, 1c and 1d. As will be explained below, the advantage of this is that it can produce a composite layer which not only has no overlap, but also has no gaps. On transverse side 2 the edge of the separating layer preferably runs parallel to said transverse side 2. The edge of the separating layer can coincide with (FIG. 1b) or project (FIG. 1c) beyond transverse side 2 of the composite layer of the web part. The choice of whether or not the separating layer should project beyond transverse sides 1 and 2 depends on the envisaged way of joining up and connecting the web parts to form a transverse web, as will be described in greater detail below.

Figure 2A:
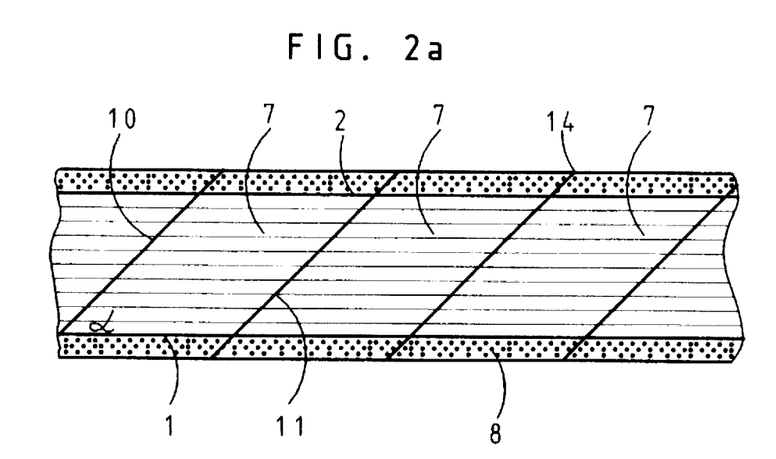
FIG. 2a shows a parallel web which is provided with a separating layer from which web parts are cut at an angle of 45°.
Figure 2B:
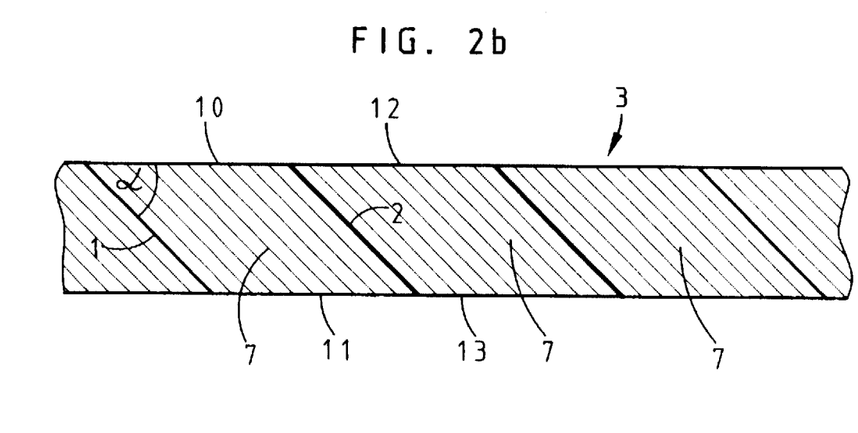
FIG. 2b shows an embodiment of the transverse web in which the fibres run at an angle of 45° relative to the lengthwise direction of the web.
Figure 2C:
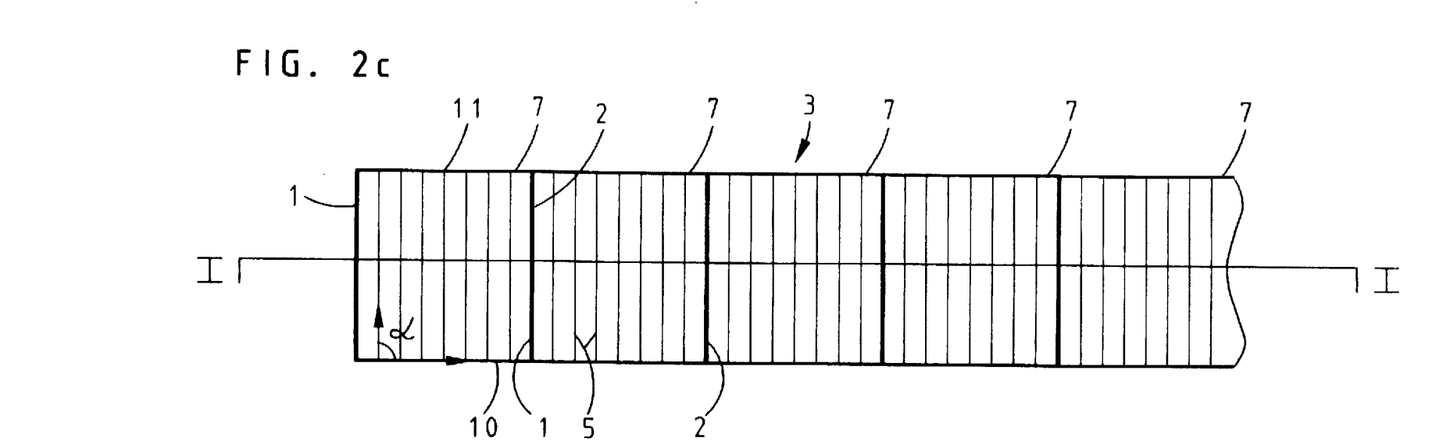
FIG. 2c shows an embodiment of the transverse web in which the fibres run at right angles to the lengthwise direction of the web.
Figure 2D:
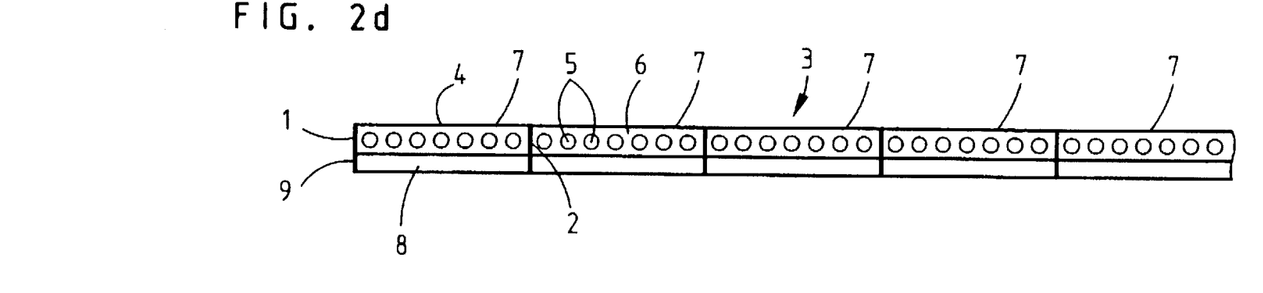
FIG. 2d shows a section along line I—I of the composite web of FIG. 2c.

The transverse web 3 is made up in the lengthwise direction of joined-up and connected web parts 7, as illustrated in FIGS. 2b, 2c and 2d. The transverse web consists of at least two web parts. The upper limit of the number of web parts, and thus the length of the transverse web, is determined by practical requirements such as, for example, ease of handling and weight. For use in a continuous process, the length of the transverse web is preferably very great. In practice, such a long transverse web is rolled up.

The web parts are joined up with transverse side 1 of the composite layer of each web part facing and essentially parallel to transverse side 2 of the composite layer of the abutted web part. This means that the fibres in all web parts run parallel to each other. The web parts are joined up with the fibres in the web parts at an angle $\alpha$ (differing from 0°) to the lengthwise direction of the transverse web. The joined-up web parts are interconnected to form a coherent transverse web, through the fact that the separating layers of the joined-up web parts are connected in the transverse web. Any suitable connecting means can be used for this. Suitable connecting means are, for example, glue, single-sided or double-sided adhesive tape or staples. FIGS. 2b and 2c show two embodiments of the transverse web. Details of the method of joining up and connection are shown in FIGS. 3a to 3d.

Transverse side 1 of the composite layer of each web part can be laid overlapping (FIGS. 3c and 3d), abutting, or with a gap (FIGS. 3a and 3b) relative to transverse side 2 of the composite layer of the joined web part. As mentioned earlier, and as will be explained below, an important feature of the invention is that, after a second layer connecting the web parts has been applied, and after removal of the separating layer of the transverse web, a composite layer without overlap is obtained, even if the composite layers of the web parts in the transverse web lie partially overlapping. This is illustrated in FIGS. 3e and 3f. The overlapped part 15 of the composite layer is confined between the separating layer of the overlapping web part and the separating layer of the overlapping web part connected thereto. After a second firmly connected layer 17 has been applied (FIG. 3e) to the composite layer of the transverse web of FIG. 3d, which second layer can take over the supporting function of the separating layer, the separating layer can be removed from the transverse web (FIG. 3f). The term "firmly connected" is meant to convey that the adhesion between the composite layer and the second layer 17 is stronger than the adhesion between the composite layer and the separating layer, so that the separating layer can be removed without the composite layer coming away from the second layer. The overlapped part 15 confined between the separating layers of the joined-up web parts can be removed together with the separating layer of the transverse web (FIG. 3f). The composite layer obtained thus has no overlap. This is also the case if the separating layer projects at transverse side 1. However, this results in a gap in the composite layer obtained over the surface of this projecting part of the separating layer. Of course, it is preferable not only to have no overlap, but also to have no gap between the composite layers. The advantage of this for use in multi-layer anti-ballistic composites is that the protection level over the surface of the multi-layer composite is essentially the same. In the embodiment of the transverse web which is most preferable, the edge 9 of the separating layer in each web part therefore coincides with transverse side 1 (FIGS. 1b and 1c), and transverse side 1 of the composite layer of each web part lies overlapping on (FIGS. 3c and 3d) or at least abuts transverse side 2 of the composite layer of the connected web part. With this transverse web it is possible to obtain a composite layer which has no overlap and no gaps either (FIG. 3f). Since in practice it is virtually impossible to lay the composite layers precisely joined up, these web parts are most preferably joined up with the composite layers partially overlapping. The degree of overlap is preferably as small as possible here, in order to limit material loss.

Figure 3A:
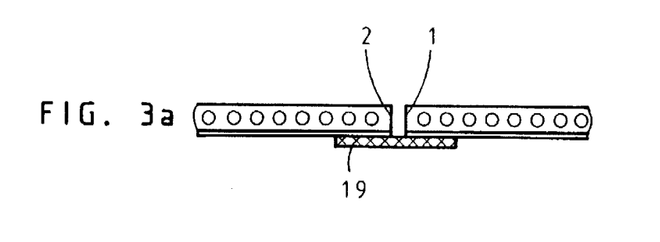
FIG. 3a shows web parts in which the edges of the separating layer coincide with the transverse sides of the composite layer, joined up with a small gap between the composite layers. The web parts are connected with an adhesive tape over the width of the transverse web.
Figure 3B:
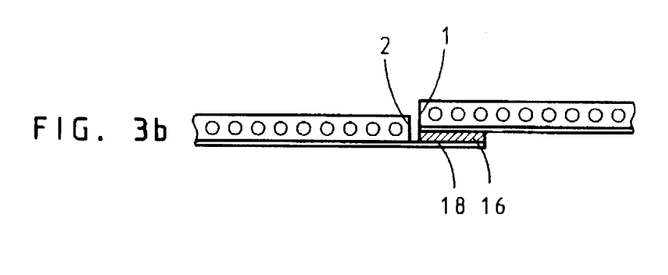
FIG. 3b shows web parts in which the separating layer projects beyond one transverse side of the composite layer, joined up with a small gap between the composite layers. The web parts are connected with an adhesive between the projecting part of the separating layer of one web part and the separating layer of the other web part.
Figure 3C:
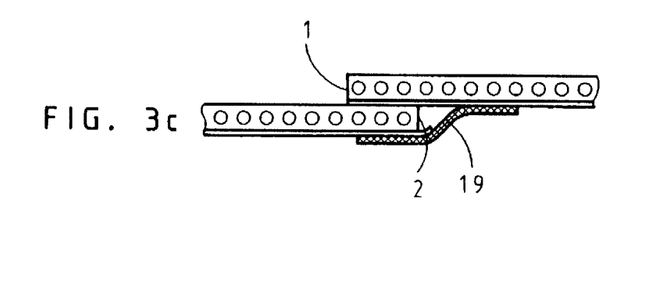
FIG. 3c shows web parts in which the separating layer projects beyond one transverse side of the composite layer and coincides with the other transverse side, the web parts being joined up with the composite layer of one web part overlapping the composite layer of the other web part. The web parts are connected with an adhesive tape over the width of the transverse web.
Figure 3D:
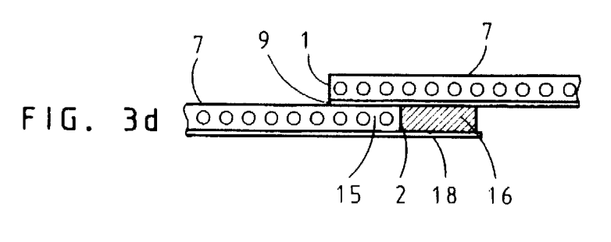
FIG. 3d shows web parts in which the separating layer projects beyond one transverse side of the composite layer, joined up with the composite layer of one web part overlapping the composite layer of the other web part. The web parts are connected with an adhesive between the projecting part of the separating layer of one web part and the separating layer of the other web part.
Figure 3E:
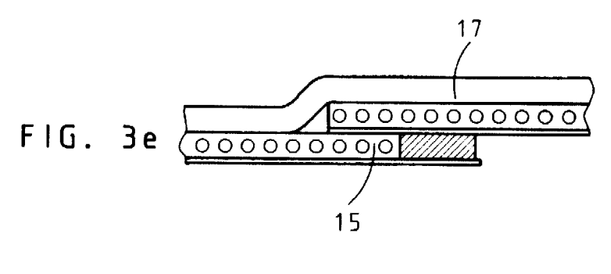
FIG. 3e shows the transverse web of FIG. 3d, on which a second layer which connects the web parts is placed.
Figure 3F:
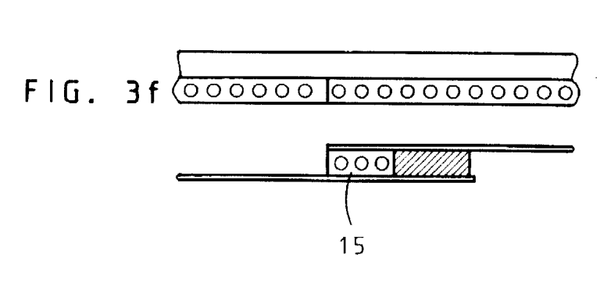
FIG. 3f shows the result after removal of the separating layer of the structure of FIG. 3e.

The web parts 7 can be connected by an adhesive tape 19 which is applied over the width of the transverse web to the side of the separating layers of the joined-up web parts facing away from the composite layer (bottom side) (FIGS. 3a and 3c). The web parts can also be connected by two or more elongated adhesive tapes which are applied to the bottom side of the separating layer with their lengthwise direction parallel to the lengthwise direction of the transverse web. Web parts in the case of which the edge of the separating layer projects beyond transverse side 2, as in FIG. 1c, can also be connected with adhesives 16 which are applied between said projecting part 18 of the separating layer and the separating layer of the overlapping web part (FIGS. 3b and 3d). If the composite layers of the web parts lie overlapping (as in FIG. 3d), this adhesive can also be applied to the confined overlapped part 15 of the composite layer, with the result that this overlapped part is easier to remove with the connected separating layers. It is most preferable for the web parts to be connected by an adhesive tape 19, as in FIGS. 3a and 3c. The advantage of this is that an adhesive tape is simpler and quicker to apply and can make a stronger connection.

The thickness of the composite layer is preferably the same in all web parts of the transverse web. The upper limit of the thickness of the composite layer is determined by the requirement that it must be relatively easy to tear off the composite layer parallel in the direction of the fibres. Since a long transverse web is generally rolled up in practice, the thickness of the composite layer is also limited by the requirement that the layer should be sufficiently deformable. This upper limit depends, inter alia, on the chosen matrix material and the fibre content. For the abovementioned reasons, the thickness of the composite layer is preferably less than 2 mm, more preferably less than 1 mm, and most preferably less than 0.5 mm. The fibre content in the composite layer can vary between 10 and 95 wt %. The thickness of the composite layer and the fibre content are selected in the light of the envisaged properties of the ultimate use of the transverse web. For example, in multi-layer anti-ballistic composites, in order to achieve a high protection level, it is preferable to use a large number of very thin composite layers with a high fibre content. The thickness of the composite layer in this case is preferably less than 500 μm, more preferably less than 100 μm, and most preferably less than 50 μm. The fibre content in this case is preferably 40–95 wt %, and most preferably 70–95 wt %.

The term fibre is meant to convey an elongated element, the longitudinal measurement of which is greater than the transverse measurement of width and thickness. The term fibre comprises, inter alia, a monofilament, a multifilament yarn, a band, a web, a thread, a staple fibre yarn, and other elongated objects with regular or irregular cross-sections.

All natural and synthetic fibres can in principle be used as fibres. For example, metal fibres, semi-metal fibres, inorganic fibres, organic fibres or mixtures thereof can be used. The material and the properties of the fibre are selected in the light of the desired properties in the ultimate use. In particular, where they are used in anti-ballistic objects, it is important that the fibres should have a high tensile strength, a high modulus of tension and a high energy absorption. The fibres preferably have a tensile strength of at least 1.2 GPa and a modulus of tension of at least 40 GPa.

Suitable inorganic fibres with a great tensile strength are, for example, glass fibres, carbon fibres and ceramic fibres. Suitable organic fibres with a high tensile strength are, for example, aramid fibres, liquid crystalline polymer fibres and fibres of, for example, polyolefins, polyvinyl alcohol, and polyacrylonitrile which are highly oriented, such as obtained, for example, by a gel spinning process.

An extensive enumeration and description of fibres which can be used in the transverse web is given in WO-A-91/12136 (page 6, line 23 to page 12, line 8).

Highly oriented polyolefin fibres are preferably used. The advantage of these fibres is that they have both a high tensile strength and a low specific weight, with the result that they are in particular very suitable for use in anti-ballistic objects.

Suitable polyolefins are in particular homopolymers and copolymers of polyethylene and polypropylene. The polyolefins used can also contain small quantities of one or more other polymers, in particular other alkene-1-polymers.

Good results are obtained if linear polyethylene (PE) is selected as the polyolefin.

Linear polyethylene here is understood to mean polyethylene with fewer than 1 side chain per 100 C atoms, and preferably with fewer than 1 side chain per 300 C atoms, and which can also contain up to 5 mol % of one or more other alkenes which are copolymerisable therewith, such as propene, butene, pentene, 4-methylpentene, octene.

Polyolefin fibres consisting of polyolefin filaments which are prepared by a gel spinning process, such as described, for example, in GB-A-2042414 and GB-A-2051667, are preferably used. This process essentially consists of preparing a solution of a polyolefin with a high intrinsic viscosity, spinning the solution to filaments at a temperature above dissolving temperature, cooling down the filaments below gelling temperature, so that gelling occurs, and stretching the filaments before, during or after the removal of the solvent.

The shape of the cross-section of the filaments can be selected here through selection of the shape of the spinning aperture.

The term matrix is meant to convey a material fully or partially enclosing the fibres which holds the fibres in position in the composite layer. A polymer material is preferably used. The polymer material of the matrix can be a thermosetting material or a thermoplastic material, or mixtures of the two. The elongation of the matrix is preferably greater than the elongation of the fibres. The matrix preferably has an elongation of 3 to 500%. Suitable thermosetting and thermoplastic matrix materials are enumerated in, for example, WO-A-91/12136 (page 15, line 26 to page 21, line 23). In the thermosetting polymers group, vinyl esters, unsaturated polyesters, epoxides or phenol resins are preferably selected as matrix material. In the thermoplastic polymers group, polyurethanes, polyvinyls, polyacrylics, polyolefins or thermoplastic elastomeric block copolymers such as polyisopropene-polyethylene-butylene-polystyrene or polystyrene-polyisoprene-polystyrene block copolymers are preferably selected as matrix material.

A matrix material which is deformable and allows the transverse web or a multi-layer web produced therewith to be deformed, for example for rolling up the web or for moulding to a moulded part, is preferably used. If the matrix has to have a high rigidity in the envisaged end use of the composite, and therefore should no longer be deformable, the preferred matrix material used is a prepreg material. A prepreg material is an impregnation agent which through an after-treatment can be converted to the envisaged matrix material. A thermosetting material is preferably used for this.

The invention also relates to a method for the production of a transverse web. This method comprises the joining up of two or more web parts 7, which web parts have a separating layer 8 and thereon a composite layer 4 of mutually parallel fibres 5 in a matrix 6, in which the composite layer has two transverse sides 1 and 2 lying opposite each other and running parallel to the fibres. The web parts are joined up with the fibre direction at an angle α (differing from 0°) to the lengthwise direction of the web, transverse side 1 of the composite layer of each web part running parallel to transverse side 2 of the composite layer of the joined-up web part. The separating layers 8 of the joined-up web parts are then connected.

It is preferable to use web parts in which the edge of the separating layer 9 coincides with transverse side 1 of the composite layer (as in FIGS. 1b and 1c), and these web parts are placed overlapping on or at least abutting transverse side 2 of the composite layer of the joined-up web part. It is most preferable to place transverse side 1 overlapping in this case (as in FIGS. 3c and 3d), because it is very difficult in practice to place composite layers accurately abutting without the risk of gaps occurring. As described above, the overlapped part 15 of the composite layer in the transverse web is removed in any case after a second layer which connects the web parts has been applied and the separating layer has been removed from the transverse web.

The web parts 7 are preferably made by cutting parallelogram-shaped pieces from a parallel web 14 which has a separating layer 8 at an angle α relative to the direction of the fibres in the parallel web (as illustrated in FIG. 2a). If in the parallel web the separating layer 8 projects beyond the transverse side 1 of the composite layer, said projecting part is preferably removed before cutting the parallel web into web parts in order to obtain web parts as in FIGS. 1b and 1c. The cut sides form the longitudinal sides 10 and 11 of the composite layer of each web part (FIG. 2b). The cut-off length in the direction of the fibres, that is the length of transverse sides 1 and 2, is equal to the envisaged width of the transverse web divided by the sine of the angle α. Such a cut-off length is preferably selected in such a way that the width of the transverse web is equal to the width of the parallel web. The advantage of this is that the same parallel web can be combined with the transverse web according to the invention for forming a cross-layered web.

Joining up the web parts with the direction of the fibres at an angle α to the lengthwise direction is preferably carried out in a way which is suitable for automated continuous production of a transverse web.

In a preferred embodiment of the method according to the invention, the web parts are supplied on a first conveyor belt with the direction of the fibres parallel to the lengthwise direction of the conveyor belt, the web part being rotated at the end of the first conveyor belt, following which it is joined and connected to the preceding web part and is discharged along a second conveyor belt disposed in line with the first conveyor belt. The angle of rotation is α, or 180°±α, depending on the arrangement of the conveyor belts and the point of rotation of the web part to be connected.

Figure 4:
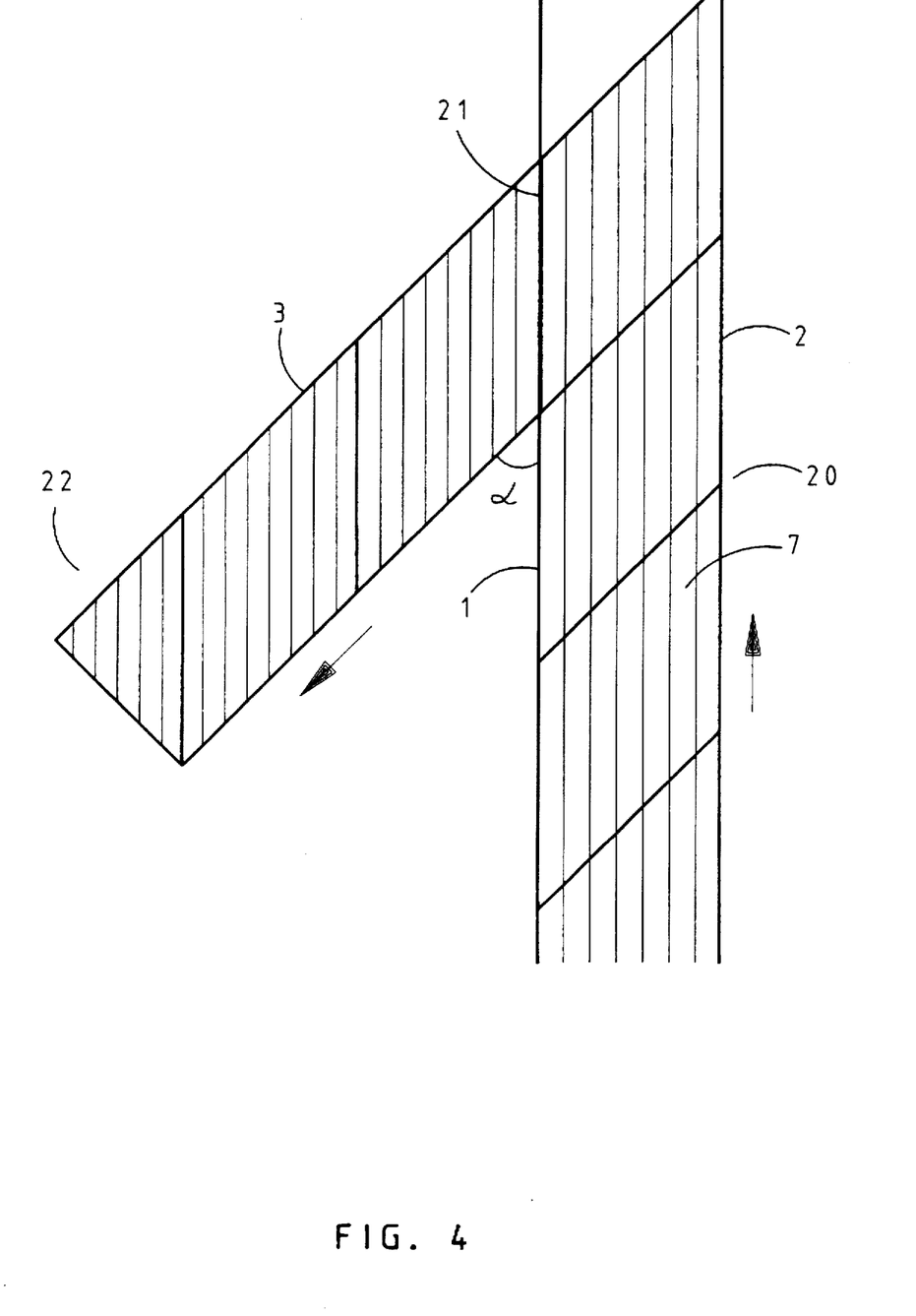
FIG. 4 shows diagrammatically an embodiment of the method for joining up the web parts.

FIG. 4 is a diagrammatic illustration of another embodiment which is most preferred. In this embodiment of the method, the web parts 7 are supplied on a first conveyor belt 20 with the direction of the fibres parallel to the lengthwise direction of the conveyor belt, each web part being joined at the end 21 of the first conveyor belt and connected to the preceding web part, and being discharged on a second conveyor belt 22, disposed at an angle α relative to the first conveyor belt. The advantage of this method is that a device for carrying out the method is simpler in terms of design, and that the web part to be connected is already lying in the correct position on the first conveyor belt for joining up, with the result that a more accurate connection can be achieved. The angle α is preferably 90°. The advantage of this is that a joining-up device is simpler in terms of design. The transverse web is preferably rolled up at the end of the second conveyor belt.

The term conveyor belt includes all conveyors which are suitable for continuously supplying web parts or discharging a transverse web.

The web parts are connected by connecting means such as, for example, an adhesive layer or an adhesive tape. These can be applied to the end 21 (FIG. 4) of the first conveyor belt, or beforehand during the supply of the web parts on the first conveyor belt 20. Adhesives are preferably applied beforehand to the separating layer at transverse side 2 of the composite layer of each web part. The web part to be joined is then laid on and pressed down on the part of the preceding web part provided with adhesives.

The transverse web makes it possible, inter alia, to produce a multi-layer composite such as a cross-layered web without overlap or gaps by simple methods and with easily obtainable non-specialist equipment.

The invention also relates to a cross-layered web in which the composite layers have no areas with overlap or gap. "No areas with overlap or gap" means "an essentially identical fibre content at all points in the layer". Through the absence of overlap and gaps, such cross-layered webs and multilayer composites produced therefrom have an essentially identical anti-ballistic protection level over the entire surface, and consequently a higher ratio between the lowest protection level on the surface and the weight per unit area. The lowest protection level is important because it determines the minimum protection level which can be guaranteed. A further advantage is that, through the absence of local thickened parts, it is simpler to produce multi-layer composites from such a cross-layered web. For example, when pieces of the cross-layered web are stacked, no provision need be made to prevent the thickened parts occurring through overlap from finishing in the same place in the stack in each case. The absence of thickened parts means that during the compression of stacked pieces of the cross-layered composite to a multi-layer composite all points on the surface of the composite are exposed to the same pressure.

The fibres in the cross-layered web preferably run in the first layer at an angle of 90° relative to the fibres in the second layer. Such cross-layered composites have better anti-ballistic properties. The two composite layers of the cross-layered web may be separated by an intermediate layer if desired. Said intermediate layer is preferably made of a polymer material. This layer can serve as, for example, additional matrix material, or as an adhesive layer.

The fibres and/or the matrix material in the first and the second composite layer may be different. One embodiment thereof is a cross-layered web in which the matrix material of one layer has, or can obtain through post-treatment, a higher modulus than the matrix material of the other composite layer. The matrix material in this case is preferably a thermoplastic in one of the layers and a thermosetting material in the other layer. Anti-ballistic objects which contain one or more layers from such a cross-layered web have both a good structural rigidity and good anti-ballistic properties.

A cross-layered web can be produced, for example, continuously by placing on a transverse web 3 another transverse web or a parallel web 14 (as in FIG. 2a), with the composite layers facing each other, and then firmly connecting the composite layers. Firmly connecting the two composite layers can be carried out in the known way, for example in a heated autoclave or through the action of pressure and/or heat such as, for example, by calendering techniques or other known laminating techniques. The composite layers can also be firmly connected by an adhesive layer between the two composite layers.

It is most preferable to produce a cross-layered web according to a method comprising:

applying a layer of parallel fibres and a quantity of matrix material to the composite layer of a transverse web, with the direction of the fibres parallel to the lengthwise direction thereof;

forming the fibres and the matrix material into a composite layer, the composite layer formed being firmly connected to the composite layer of the composite web;

removing the separating layer of the transverse web.

The advantage of this method is that no separating layer is needed for applying the second composite layer. This means a reduction in production costs. This is an advantage in particular in the case of anti-ballistic composites, in which a large number of very thin layers are preferably used. A further advantage is that the formation of the second composite layer and the firm connection thereof to the composite layer of the transverse web is carried out combined in one process step.

The layer of parallel fibres can be applied by guiding a number of fibres from a fibre reel over a comb, with the result that they are directed parallel in one plane, and then laying them on the transverse web. In this case it is possible to use fibres which are covered beforehand with a quantity of matrix material. It is preferable to use uncovered fibres and to add the matrix material later. This can be carried out by, for example, laying one or more films of the matrix material on and/or under the face of the fibres, or most preferably, after directing the fibres parallel in one plane to cover them with a quantity of a liquid substance containing the matrix material. The advantage of this is that a much more rapid and much better adhesion is obtained between the composite layers. The liquid substance can be, for example, a solution, a dispersion or a melt of the matrix material, or a prepreg material. If a solution or a dispersion of the matrix material is used, forming to a composite layer also comprises the evaporation of the solvent or dispersion medium. Most preferably, an aqueous dispersion of a matrix material is used. An aqueous dispersion has a low viscosity. The advantage of this is that the fibres are well impregnated. A further advantage is that the dispersion medium, water, is non-toxic and can therefore be evaporated in the open air. The layer applied is then formed in the known manner to a composite layer, and the two composite layers are also firmly connected. This is preferably carried out at a raised temperature, in which case the matrix material can flow between the fibres and can adhere to the composite layer of the transverse web. The temperature is preferably above the softening or melting temperature of the matrix material and below the melting temperature of the fibres. The layer applied is then pressed onto the composite layer of the transverse web. After the composite layers are firmly connected, the separating layer can be removed from the transverse web.

In the above-described method an additional layer can simultaneously be placed on the second composite layer and firmly connected thereto in the same process step. For example, starting from a transverse web and a cross-layered web as the additional layer, a 4-layer cross-layered composite can be produced in one step.

The transverse web and the cross-layered web according to the invention can be used in a multi-layer composite. Multi-layer composites can be made continuously starting from two or more transverse webs, parallel webs or cross-layered webs by placing them over one another, preferably from a roll, with or without an adhesive layer separating them, and by connecting them firmly in a known way, for example through the action of pressure and/or heat. Such multi-layer composites have the advantage that they have no areas with overlap or gaps, with the result that they are particularly suitable for use in anti-ballistic objects.

We claim:

1. A composite web which in the lengthwise direction is made up of joined-up and connected web parts, which web parts contain a separating layer and thereon a composite layer of mutually essentially parallel fibres in a matrix, the composite layer of each web part being bounded by two transverse sides and lying opposite each other and running parallel to the fibres, which web parts are joined up, with a transverse side of the composite layer of each web part facing and parallel to the other transverse side or the composite layer of the joined-up web part, and with the fibres in the web parts at an angle a α, differing from 0° to the lengthwise direction of the composite web, and in which the separating layers of the joined-up web parts are connected to each other.

2. A composite web according to claim 1, wherein in each web part the edge of the separating layer coincides with a transverse side, and in that transverse side of the composite layer of each web part lies overlapping on or at least abuts the transverse side of the composite layer of the connected web part.

3. A composite web according to claim 1 or 2, wherein the composite layer of each web part is parallelogram-shaped with an angle α between transverse side (1) and the lengthwise direction of the web.

4. A composite web according to claim 1 or 2, wherein the angle α is 90°.

5. A method for the production of a composite web according to claim 1 comprising the combination of steps:

the joining up of two or more web parts, which web parts have a separating layer and thereon a composite layer of mutually parallel fibres in a matrix, in which the composite layer has two transverse sides and lying opposite each other and running parallel to the fibres, and in which the web parts are joined up with the fibre direction at an angle α, differing from 0°, to the lengthwise direction of the web, transverse side of the composite layer of each web part running parallel to transverse side of the composite layer of the joined-up web part; and subsequently connecting the separating layers of the joined-up web parts.

6. A method according to claim 5 for the continuous production of a continuous length of a composite web, wherein in that the web parts are supplied on a first conveyor belt with the direction of the fibres parallel to the lengthwise direction of the conveyor belt, while at the end of the first conveyor belt each web part is joined and connected to the preceding web part and is discharged on a second conveyor belt positioned at an angle α to the first conveyor belt.

7. A method for the continuous production of a continuous length of a cross-layered web comprising a first and thereon a second composite layer of mutually essentially parallel fibres in a matrix, in which the fibres in the first composite layer lie at an angle, differing from 0°, relative to the fibres in the second composite layer, characterized in that, the composite web according to one of claims 1 or 2 is laminated with the composite layer of another composite web according to one of claims 1 or 2 or with a continuous length of a parallel web; and the separating layers are subsequently removed.

8. A method for the continuous production of a continuous length of a cross-layered web comprising a first and thereon a second composite layer of mutually essentially parallel fibres in a matrix, in which the fibres in the first composite layer lie at an angle, differing from 0°, relative to the fibres in the second composite layer, comprising:

applying onto the (first) composite layer of a continuous length of a composite web according to one of claims 1–2, a layer of parallel continuous fibres and, in a separate step, applying to said fibers a quantity of matrix material, the direction of the continuous fibres being parallel to the lengthwise direction of the composite web;

in-situ forming the applied fibres and matrix material into the second composite layer at elevated temperature, the composite layer formed being firmly connected to the composite layer of the composite web; and removing the separating layer.

9. A method according to claim 8, wherein the fibres are provided with a liquid substance containing the matrix material.

10. Method according to claim 9, wherein the liquid substance is an aqueous dispersion of the matrix material.

11. An anti-ballistic article comprising a multi-layered composite manufactured from a cross-layered web obtained by the method according to claim 7.

12. A cross-layered web of continuous length comprising a first and a second composite layer of mutually essentially parallel fibers in a matrix, in which the fibers of the fibers of the first composite layer lie at an angle, differing from 0°, relative to the fibers in the second composite layer, wherein the composite layers have no areas with overlap.

13. A cross-layered web of continuous length obtained by a method according to claim 7, wherein the composite layers have no areas of overlap or gaps.

14. A multi-layer composite manufactured from a cross-layered web according to claims 12 and 13.

15. An anti-ballistic article comprising a multi-layered composite manufactured from a cross-layered web obtained by the method according to claim 8.

16. An anti-ballistic article comprising a multi-layered composite manufactured from a cross-layered web obtained by the method according to claim 9.

17. An anti-ballistic article comprising a multi-layered composite manufactured from a cross-layered web obtained by the method according to claim 10.

18. A cross-layered web of continuous length obtained by a method according to claim 8, wherein the composite layers have no areas of overlap.

19. A cross-layered web of continuous length obtained by a method according to claim 9, wherein the composite layers have no areas of overlap.

20. A cross-layered web of continuous length obtained by a method according to claim 10, wherein the composite layers have no areas of overlap.

* * * * *